United States Patent
Brilliant et al.

(10) Patent No.: US 11,971,051 B2
(45) Date of Patent: *Apr. 30, 2024

(54) COMPRESSOR FLOWPATH

(71) Applicant: RTX CORPORATION, Farmington, CT (US)

(72) Inventors: Lisa I. Brilliant, Middletown, CT (US); Becky E. Rose, Colchester, CT (US); Yuan Dong, Glastonbury, CT (US); Stanley J. Balamucki, The Villages, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,805

(22) Filed: Jun. 9, 2023

(65) Prior Publication Data

US 2023/0332622 A1    Oct. 19, 2023

Related U.S. Application Data

(63) Continuation of application No. 17/892,529, filed on Aug. 22, 2022, now Pat. No. 11,725,670, which is a
(Continued)

(51) Int. Cl.
*F02K 3/06*    (2006.01)
*F02K 3/04*    (2006.01)
(Continued)

(52) U.S. Cl.
CPC .............. *F04D 29/547* (2013.01); *F02K 3/04* (2013.01); *F02K 3/06* (2013.01); *F04D 19/028* (2013.01);
(Continued)

(58) Field of Classification Search
CPC .... F04D 29/547; F04D 29/563; F04D 29/321; F04D 29/522; F04D 25/045; F02K 3/06; F02K 3/04
See application file for complete search history.

(56) References Cited

U.S. PATENT DOCUMENTS 2,258,792 A    10/1941    New
2,672,726 A    3/1954    Wolf et al.
(Continued)

FOREIGN PATENT DOCUMENTS

EP    0791383 A1    8/1997
EP    1142850 A1    10/2001
(Continued)

OTHER PUBLICATIONS

Mancuso, J.R. and Corcoran, J.P. (2003). What are the differences in high performance flexible couplings for turbomachinery? Proceedings of the Thirty-Second Turbomachinery Symposium. 2003. pp. 189-207.
(Continued)

*Primary Examiner* — Justin D Seabe
*Assistant Examiner* — Behnoush Haghighian
(74) *Attorney, Agent, or Firm* — Carlson, Gaskey & Olds, P.C.

(57) ABSTRACT

A gas turbine engine according to an example of the present disclosure includes, among other things, a propulsor section including a propulsor that delivers flow to a core flowpath and a compressor section including first and second compressors. The core flowpath passes through the first compressor. The core flowpath in the first compressor has an outer diameter relative to the engine longitudinal axis. The outer diameter has a slope angle relative to the axis.

19 Claims, 3 Drawing Sheets

Related U.S. Application Data continuation of application No. 16/715,528, filed on Dec. 16, 2019, now Pat. No. 11,428,242, which is a continuation of application No. 15/084,643, filed on Mar. 30, 2016, now Pat. No. 10,544,802, which is a continuation of application No. 13/409,305, filed on Mar. 1, 2012, now abandoned.

(60) Provisional application No. 61/593,001, filed on Jan. 31, 2012.

(51) Int. Cl.

| F04D 19/02 | (2006.01) |
|---|---|
| F04D 25/04 | (2006.01) |
| F04D 29/32 | (2006.01) |
| F04D 29/52 | (2006.01) |
| F04D 29/54 | (2006.01) |
| F04D 29/56 | (2006.01) |
| F04D 29/68 | (2006.01) |

(52) U.S. Cl.
CPC ......... *F04D 25/045* (2013.01); *F04D 29/321* (2013.01); *F04D 29/522* (2013.01); *F04D 29/563* (2013.01); *F04D 29/681* (2013.01); *F05D 2220/3217* (2013.01); *F05D 2220/36* (2013.01); *F05D 2260/606* (2013.01)

(56) References Cited

U.S. PATENT DOCUMENTS

| 2,798,360 | A | 7/1957 | Hazen et al. |
|---|---|---|---|
| 2,936,655 | A | 5/1960 | Peterson et al. |
| 3,021,731 | A | 2/1962 | Stoeckicht |
| 3,066,912 | A | 12/1962 | Scheper, Jr. |
| 3,194,487 | A | 7/1965 | Tyler et al. |
| 3,287,906 | A | 11/1966 | Mccormick |
| 3,352,178 | A | 11/1967 | Lindgren et al. |
| 3,412,560 | A | 11/1968 | Gaubatz |
| 3,664,612 | A | 5/1972 | Skidmore et al. |
| 3,673,802 | A | 7/1972 | Krebs et al. |
| 3,680,309 | A | 8/1972 | Wallace, Jr. |
| 3,747,343 | A | 7/1973 | Rosen |
| 3,754,484 | A | 8/1973 | Roberts |
| 3,761,042 | A | 9/1973 | Denning |
| 3,765,623 | A | 10/1973 | Donelson et al. |
| 3,792,586 | A | 2/1974 | Kasmarik et al. |
| 3,820,719 | A | 6/1974 | Clark et al. |
| 3,843,277 | A | 10/1974 | Ehrich |
| 3,892,358 | A | 7/1975 | Gisslen |
| 3,925,979 | A | 12/1975 | Ziegler |
| 3,932,058 | A | 1/1976 | Harner et al. |
| 3,935,558 | A | 1/1976 | Miller et al. |
| 3,988,889 | A | 11/1976 | Chamay et al. |
| 4,104,876 | A | 8/1978 | Larsen et al. |
| 4,130,872 | A | 12/1978 | Haloff |
| 4,220,171 | A | 9/1980 | Ruehr et al. |
| 4,240,250 | A | 12/1980 | Harris |
| 4,284,174 | A | 8/1981 | Salvana et al. |
| 4,289,360 | A | 9/1981 | Zirin |
| 4,478,551 | A | 10/1984 | Honeycutt, Jr. et al. |
| 4,649,114 | A | 3/1987 | Miltenburger et al. |
| 4,696,156 | A | 9/1987 | Burr et al. |
| 4,704,862 | A | 11/1987 | Dennison et al. |
| 4,722,357 | A | 2/1988 | Wynosky |
| 4,782,658 | A | 11/1988 | Perry |
| 4,827,712 | A | 5/1989 | Coplin |
| 4,979,362 | A | 12/1990 | Vershure, Jr. |
| 5,058,617 | A | 10/1991 | Stockman et al. |
| 5,102,379 | A | 4/1992 | Pagluica et al. |
| 5,123,240 | A | 6/1992 | Frost et al. |
| 5,127,794 | A | 7/1992 | Burge et al. |
| 5,141,400 | A | 8/1992 | Murphy et al. |
| 5,317,877 | A | 6/1994 | Stuart |
| 5,361,580 | A | 11/1994 | Ciokajlo et al. |
| 5,380,155 | A | 1/1995 | Varsik et al. |
| 5,433,674 | A | 7/1995 | Sheridan et al. |
| 5,447,411 | A | 9/1995 | Curley et al. |
| 5,466,198 | A | 11/1995 | McKibbin et al. |
| 5,524,847 | A | 6/1996 | Brodell et al. |
| 5,634,767 | A | 6/1997 | Dawson |
| 5,677,060 | A | 10/1997 | Terentieva et al. |
| 5,778,659 | A | 7/1998 | Duesler et al. |
| 5,806,303 | A | 9/1998 | Johnson |
| 5,809,772 | A | 9/1998 | Giffin, III et al. |
| 5,845,482 | A | 12/1998 | Carscallen |
| 5,857,836 | A | 1/1999 | Stickler et al. |
| 5,867,980 | A | 2/1999 | Bartos |
| 5,915,917 | A | 6/1999 | Eveker et al. |
| 5,975,841 | A | 11/1999 | Lindemuth et al. |
| 5,985,470 | A | 11/1999 | Spitsberg et al. |
| 6,148,518 | A | 11/2000 | Weiner et al. |
| 6,203,273 | B1 | 3/2001 | Weiner et al. |
| 6,223,616 | B1 | 5/2001 | Sheridan |
| 6,240,719 | B1 | 6/2001 | Vondrell et al. |
| 6,315,815 | B1 | 11/2001 | Spadaccini et al. |
| 6,318,070 | B1 | 11/2001 | Rey et al. |
| 6,338,609 | B1 | 1/2002 | Decker et al. |
| 6,387,456 | B1 | 5/2002 | Eaton, Jr. et al. |
| 6,517,341 | B1 | 2/2003 | Brun et al. |
| 6,607,165 | B1 | 8/2003 | Manteiga et al. |
| 6,709,492 | B1 | 3/2004 | Spadaccini et al. |
| 6,766,639 | B2 | 7/2004 | Malmborg |
| 6,814,541 | B2 | 11/2004 | Evans et al. |
| 6,883,303 | B1 | 4/2005 | Seda |
| 7,004,722 | B2 | 2/2006 | Teramura et al. |
| 7,021,042 | B2 | 4/2006 | Law |
| 7,219,490 | B2 | 5/2007 | Dev |
| 7,328,580 | B2 | 2/2008 | Lee et al. |
| 7,374,403 | B2 | 5/2008 | Decker et al. |
| 7,487,630 | B2 | 2/2009 | Weiler |
| 7,591,754 | B2 | 9/2009 | Duong et al. |
| 7,632,064 | B2 | 12/2009 | Somanath et al. |
| 7,662,059 | B2 | 2/2010 | McCune |
| 7,694,505 | B2 | 4/2010 | Schilling |
| 7,806,651 | B2 | 10/2010 | Kennepohl et al. |
| 7,824,305 | B2 | 11/2010 | Duong et al. |
| 7,828,682 | B2 | 11/2010 | Smook |
| 7,883,315 | B2 | 2/2011 | Suciu et al. |
| 7,926,260 | B2 | 4/2011 | Sheridan et al. |
| 7,997,868 | B1 | 8/2011 | Liang |
| 8,205,432 | B2 | 6/2012 | Sheridan |
| 2005/0106009 | A1 | 5/2005 | Cummings et al. |
| 2005/0265825 | A1 | 12/2005 | Lewis |
| 2006/0090451 | A1 | 5/2006 | Moniz et al. |
| 2006/0130456 | A1 | 6/2006 | Suciu et al. |
| 2006/0196164 | A1 | 9/2006 | Donohue |
| 2006/0228206 | A1 | 10/2006 | Decker et al. |
| 2007/0137175 | A1 | 6/2007 | Moniz |
| 2007/0251210 | A1 | 11/2007 | Ceric et al. |
| 2008/0003096 | A1 | 1/2008 | Kohli et al. |
| 2008/0053062 | A1 | 3/2008 | Tuttle |
| 2008/0072567 | A1 | 3/2008 | Moniz et al. |
| 2008/0098715 | A1 | 5/2008 | Orlando et al. |
| 2008/0116009 | A1 | 5/2008 | Sheridan et al. |
| 2008/0317588 | A1 | 12/2008 | Grabowski et al. |
| 2009/0056306 | A1 | 3/2009 | Suciu et al. |
| 2009/0056343 | A1 | 3/2009 | Suciu et al. |
| 2009/0185911 | A1 | 7/2009 | Roberge |
| 2009/0293449 | A1 | 12/2009 | Venter |
| 2009/0304518 | A1 | 12/2009 | Kodama et al. |
| 2009/0314881 | A1 | 12/2009 | Suciu et al. |
| 2010/0058735 | A1 | 3/2010 | Hurwitz et al. |
| 2010/0105516 | A1 | 4/2010 | Sheridan et al. |
| 2010/0148396 | A1 | 6/2010 | Xie et al. |
| 2010/0212281 | A1 | 8/2010 | Sheridan |
| 2010/0218483 | A1 | 9/2010 | Smith |
| 2010/0223903 | A1 | 9/2010 | Starr |
| 2010/0247306 | A1 | 9/2010 | Merry et al. |
| 2010/0331139 | A1 | 12/2010 | McCune |
| 2011/0159797 | A1 | 6/2011 | Beltman et al. |

(56) References Cited

U.S. PATENT DOCUMENTS

2011/0293423 A1 12/2011 Bunker et al.
2012/0124964 A1 5/2012 Hasel et al.

FOREIGN PATENT DOCUMENTS

| | | | |
|---|---|---|---|
| EP | 1013889 B1 | 8/2005 | |
| GB | 1516041 A | 6/1978 | |
| GB | 2041090 A | 9/1980 | |
| GB | 2426792 A | 12/2006 | |
| WO | 2007038674 A1 | 4/2007 | |

OTHER PUBLICATIONS

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid- silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

Mcardle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mccracken, R.C. (1979). Quiet short-haul research aircraft familiarization document. NASA-TM-81149. Nov. 1, 1979. pp. 1-76.

Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.

Mcmillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise impact. NASA-CR-114759. Jun. 1, 1974. pp. 1-397.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc? Screen=cp_nanofiber.

QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE over-the-wing final design report. (1977). NASA-CR-134848. Jun. 1, 1977. pp. 1-460.

QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

QCSEE preliminary analyses and design report. vol. II. (1974). NASA-CR-134839. Oct. 1, 1974. pp. 340-630.

QCSEE the aerodynamic and mechanical design of the QCSEE under-the-wing fan. (1977). NASA-CR-135009. Mar. 1, 1977. pp. 1-137.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

(56) References Cited

OTHER PUBLICATIONS

QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-22.
El-Sayad, A.F. (2008). Aircraft propulsion and gas turbine engines. Boca Raton, Fl: Crd Press. pp. 215-9 and 855-60.
Faghri, A. (1995). Heat pipe and science technology. Washington, D.C.: Taylor Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Garret TFE731 Turbofan Engine (Cat C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. Ge Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating

(56) References Cited

OTHER PUBLICATIONS rake. NASA-TM-105989. Prepared for the 31st Aerospace Sciences Meeting. Reno, NV. Jan. 11-14, 1993. pp. 1-30.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.
Hess, C. (1998). Pratt Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-8.
Rauch, D. (1972). Design study of an air pump and integral lift engine ALF-504 using the Lycoming 502 core. Prepare for NASA. Jul. 1972. pp. 1-182.
Reshotko, M., Karchmer, A., Penko, P.F. and Mcardle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology- Opportunities, challenges and readiness status. Porceedings CEAS. Sep. 10-13, 2007. Berlin, Germany. pp. 1-12.
Rolls-Royce M45H. Jane's Aero-engines, Aero-engines-Turbofan. Feb. 24, 2010.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley Sons, Inc. pp. 722-6 and 764-71.
Shah, D.M. (1992). MoSi2 and other silicides as high temperature structural materials. Superalloys 1992. The Minerals, Metals, Materials Society. pp. 409-422.
Shorter Oxford English Dictionary, 6th Edition. (2007), vol. 2, N-Z, p. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-76.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-23.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-46.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-49.
Sweetman, B. and Sutton, O. (1998). Pratt Whitney's surprise leap. Interavia Business Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-38.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-8.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retrieved from: https://datathief.org/DatathiefManual.pdf pp. 1-52.
Turbomeca Aubisque. Jane's Aero-engines, Aero-engines-Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. EgNE. Department of Transportation Federal Aviation Administration. Jun. 7, 2002. pp. 1-10.

(56) References Cited

OTHER PUBLICATIONS

U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Walsh, P.P. and Fletcher, P. (2004). Gas turbine performance, 2nd Edition. Oxford, UK: Blackwell Science. pp. 159-177.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
2003 NASA seal/secondary air system workshop. (2003). NASA/CP-2004-212963/VOL1. Sep. 1, 2004. pp. 1-408.
About Gas Turb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley Sons, Inc. New York: New York. pp. 1-11, 13-23, 26-33, 50-1, 56-8, 60-1, 64-71, 87-9, 324-9, 436-7.
AGMA Standard (1997). Design and selection of components for enclosed gear drives. lexandria, VA: American Gear Manufacturers Association. pp. 1-48.
AGMA Standard (1999). Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine Aeroengine Congress Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. Alf 502L Maintenance Manual. Apr. 1981. pp. 1-118.
Aviadvigatel D-110. Jane's Aero-engines, Aero-engines-Turbofan. Jun. 1, 2010.

Awker, R.W. (1986). Evaluation of propfan propulsion applied to general aviation. Nasa CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-84.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B K Engineering, Inc. Jun. 1979. pp. 1-348.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for Nasa. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.

(56) References Cited

OTHER PUBLICATIONS

Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B For the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-7.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,689,568, Executed Mar. 28, 2016, pp. 1-87.
Hill, P.G., Peterson, C.R. (1992). Mechanics and thermodynamics of propulsion, 2nd Edition. Addison-Wesley Publishing Company, Inc. pp. 400-6.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines-Turbofan. Feb. 9, 2012.
Honeywell LF502. Jane's Aero-engines, Aero-engines-Turbofan. Aug. 17, 2016.
Honeywell LF507. Jane's Aero-engines, Aero-engines-Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines-Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for PCT Application No. PCT/US2013/022020 dated Aug. 14, 2014.
Ivchenko-Progress AI-727M. Jane's Aero-engines, Aero-engines-Turbofan. Nov. 27, 2011.
Ivchenko-Progress D-436. Jane's Aero-engines, Aero-engines-Turbofan. Feb. 8, 2012.
Ivchenko-Progress D-727. Jane's Aero-engines, Aero-engines-Turbofan. Feb. 7, 2007.
Jacobson, N.S. (1993). Corrosion of silicon-based ceramics in combustion environments. J. Am. Ceram. Soc. 76(1). pp. 3-28.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study- final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week Space Technology, 148(8). p. 34-5.
Kandebo, S.W. (1998). Pratt Whitney launches geared turbofan engine. Aviation Week Space Technology, 148(8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press. p. 11.
Knip, Jr., G. (1987). Analysis of an advanced technology subsonic turbofan incorporating revolutionary materials. NASA Technical Memorandum. May 1987. pp. 1-23.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Kurzke, J. (2001). GasTurb 9: A program to calculate design and off-design performance of gas turbines. Retrieved from: https://www.scribd.com/document/92384867/GasTurb9Manual.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Kurzke, J. (2012). GasTurb 12: Design and off-design performance of gas turbines. Retrieved from: https://www.scribd.com/document/153900429/GasTurb-12.
Leckie, F.A. and Dal Bello, D.J. (2009). Strength and stiffness of engineering systems. Mechanical Engineering Series. Springer. pp. 1-10, 48-51.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-63.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

(56) References Cited

OTHER PUBLICATIONS

Liebeck, R.H., Andrastek, D.A., Chau, J., Girvin, R., Lyon, R., Rawdon, B.K., Scott, P.W. et al. (1995). Advanced subsonic airplane design economics studies. NASA CR-195443. Apr. 1995. pp. 1-187.

Litt, J.S. (2018). Sixth NASA Glenn Research Center propulsion control and diagnostics (PCD) workshop. NASA/CP-2018-219891. Apr. 1, 2018. pp. 1-400.

Lord, W.K., Macmartin, D.G., and Tillman, T.G. (2000). Flow control opportunities in gas turbine engines. American Institute of Aeronautics and Astronautics. pp. 1-15.

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley Sons, Ltd. pp. 260-5.

Whitaker, R. (1982). ALF 502: plugging the turbofan gap. Flight International, p. 237-241, Jan. 30, 1982.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting Exhibit. Jan. 6-9, 1992. pp. 1-14.

WIKIPEDIA. Stiffness. Retrieved Jun. 28, 2018 from: https://en.wikipedia.org/wiki/Stiffness.

WIKIPEDIA. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

COMPRESSOR FLOWPATH

CROSS-REFERENCE TO RELATED APPLICATION

The present application is a continuation of U.S. patent application Ser. No. 17/892,529, filed Aug. 22, 2022, which is a continuation of U.S. patent application Ser. No. 16/715,528, filed Dec. 16, 2019, which is a continuation of U.S. patent application Ser. No. 15/084,643, filed Mar. 30, 2016, which is a continuation of U.S. patent application Ser. No. 13/409,305, filed Mar. 1, 2012, which claims priority to U.S. Provisional Application No. 61/593,001, which was filed on Jan. 31, 2012, and is incorporated herein by reference.

TECHNICAL FIELD

The present application relates generally to gas turbine engines, and more particularly to a low pressure compressor flowpath for a gas turbine engine.

BACKGROUND OF THE INVENTION

Commercial turbofan engines use low pressure compressors coupled to a fan. Advances in coupling the fan to the low pressure compressor have allowed the compressor to operate at higher speeds and to decrease the number of compressor stages required of the compressor. Decreasing the number of stages and increasing the rotational speed of the low pressure compressor causes existing flowpath designs to be non-optimal and results in decreased performance when the existing flowpath designs are used.

SUMMARY OF THE INVENTION

A compressor section for a gas turbine engine according to an example of the present disclosure includes a low pressure compressor including a plurality of rotor blades arranged about an axis, a high pressure compressor including a greater number of stages than the low pressure compressor, and a core flowpath passing through the low pressure compressor. The core flowpath at the low pressure compressor defines an inner diameter and an outer diameter relative to the axis. The outer diameter has a slope angle relative to the axis, and the slope angle is between 10 degrees and 15 degrees relative to the axis.

In a further embodiment of any of the foregoing embodiments, the slope angle slopes toward the axis along a fluid flow direction of the core flowpath.

In a further embodiment of any of the foregoing embodiments, the outer diameter is defined by one of the plurality of rotor blades.

In a further embodiment of any of the foregoing embodiments, the inner diameter of the core flowpath increases through the low pressure compressor along a fluid flow direction.

In a further embodiment of any of the foregoing embodiments, the low pressure compressor includes at least one variable vane situated in the core flowpath.

In a further embodiment of any of the foregoing embodiments, the low pressure compressor includes an exit guide vane located in a low pressure compressor outlet section of the core flowpath.

In a further embodiment of any of the foregoing embodiments, the low pressure compressor includes a low pressure bleed located between a low pressure compressor rotor and the exit guide vane, and the low pressure bleed includes a bleed trailing edge configured to extend into the core flowpath beyond the outer diameter of the core flowpath.

In a further embodiment of any of the foregoing embodiments, the low pressure compressor is a multi-stage compressor.

In a further embodiment of any of the foregoing embodiments, the low pressure compressor is a three stage compressor, and the high pressure compressor includes a greater number of stages than the low pressure compressor.

A gas turbine engine according to an example of the present disclosure includes a fan section, a compressor section including a low pressure compressor defining an axis, a high pressure compressor including a greater number of stages than the low pressure compressor, and a core flowpath passing through the low pressure compressor. A turbine section includes a high pressure turbine and a low pressure turbine. The low pressure turbine is configured to drive the low pressure compressor and the fan section. The low pressure turbine includes a greater number of stages than the low pressure compressor, and the low pressure compressor includes a greater number of stages than the high pressure turbine. The core flowpath has an inner diameter and an outer diameter relative to the axis, and the outer diameter has a slope angle that is between 10 degrees and 15 degrees relative to the axis.

In a further embodiment of any of the foregoing embodiments, the gas turbine engine is a two-spool turbofan.

In a further embodiment of any of the foregoing embodiments, the fan delivers air into a bypass duct, and a portion of air into the compressor section, with a bypass ratio defined as the volume of air delivered into the bypass duct compared to the volume of air delivered into the compressor section, and the bypass ratio being greater than about 10.

In a further embodiment of any of the foregoing embodiments, a pressure ratio across the fan section is less than about 1.6.

In a further embodiment of any of the foregoing embodiments, a pressure ratio across the low pressure turbine is greater than about 5.

In a further embodiment of any of the foregoing embodiments, the low pressure turbine is configured to drive the fan section through a geared architecture.

A method of designing a gas turbine engine according to an example of the present disclosure includes providing a fan section, and providing a compressor section defining a longitudinal axis. The compressor section includes a low pressure compressor having a plurality of rotor blades, a high pressure compressor including a larger number of stages than the low pressure compressor, and a core flowpath passing through the low pressure compressor. A turbine section includes a high pressure turbine and a low pressure turbine. The low pressure turbine is configured to drive the low pressure compressor and the fan section, and the high pressure turbine including two stages and configured to drive the high pressure compressor. The core flowpath has an inner diameter and an outer diameter at the low pressure compressor, and the outer diameter has a positive slope angle that is less than or equal to 15 degrees such that the outer diameter slopes inwardly relative to the longitudinal axis.

In a further embodiment of any of the foregoing embodiments, the low pressure turbine includes a greater number of stages than the low pressure compressor.

In a further embodiment of any of the foregoing embodiments, the slope angle is between approximately 10 degrees and approximately 15 degrees relative to the longitudinal axis.

In a further embodiment of any of the foregoing embodiments, the low pressure compressor is a three stage compressor.

In a further embodiment of any of the foregoing embodiments, the fan section is configured to deliver air into a bypass duct, and a portion of air into the compressor section, with a bypass ratio defined as the volume of air delivered into the bypass duct compared to the volume of air delivered into the compressor section, and the bypass ratio is greater than about 10.

These and other features of the present invention can be best understood from the following specification and drawings, the following of which is a brief description.

DETAILED DESCRIPTION OF A PREFERRED EMBODIMENT

Figure 1:
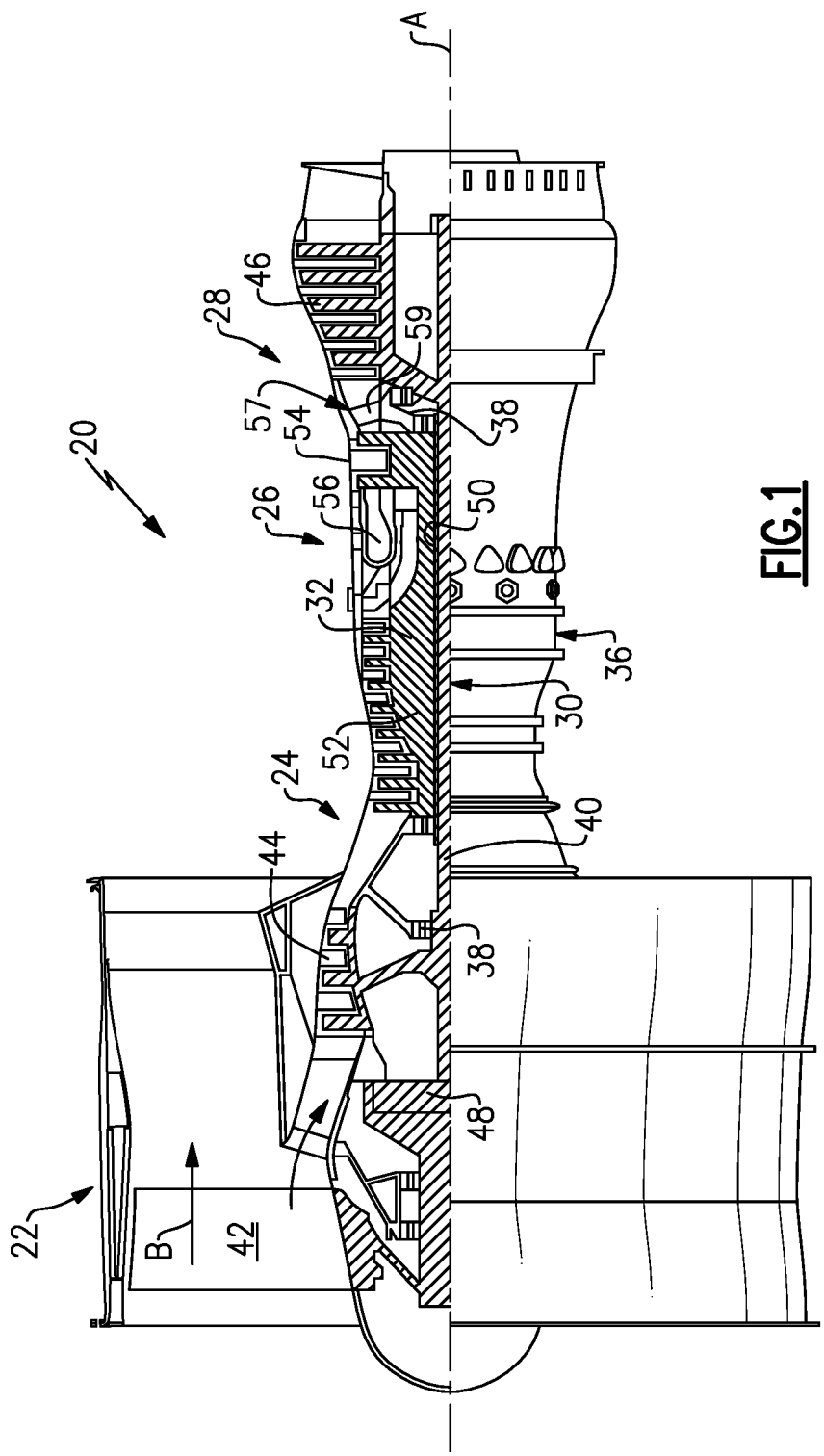
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include, for example, a three-spool design, an augmentor section, and different arrangements of sections, among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The low pressure compressor 44 is the first compressor in the core flowpath relative to the fluid flow through the core flowpath. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The high pressure compressor 52 is the compressor that connects the compressor section to a combustor 56, and is the last illustrated compressor 52 in the illustrated example of FIG. 1 relative to the core flowpath. The combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.25 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of 1 bm of fuel being burned divided by 1 bf of thrust the engine produces at that minimum point. "Fan pressure ratio" is the pressure ratio across the fan blade alone, without a Fan Exit Guide Vane ("FEGV") system present. The low fan pressure ratio as disclosed herein according to one non-limiting embodiment is less than about 1.6. "Low corrected fan tip speed" is the actual fan tip speed in ft/sec divided by an industry standard temperature correction of $[(\text{Tambient deg R})/518.7)\char`\^0.5]$. The "Low corrected fan tip speed" as disclosed herein according to one non-limiting embodiment is less than about 1250 ft/second.

Figure 2:
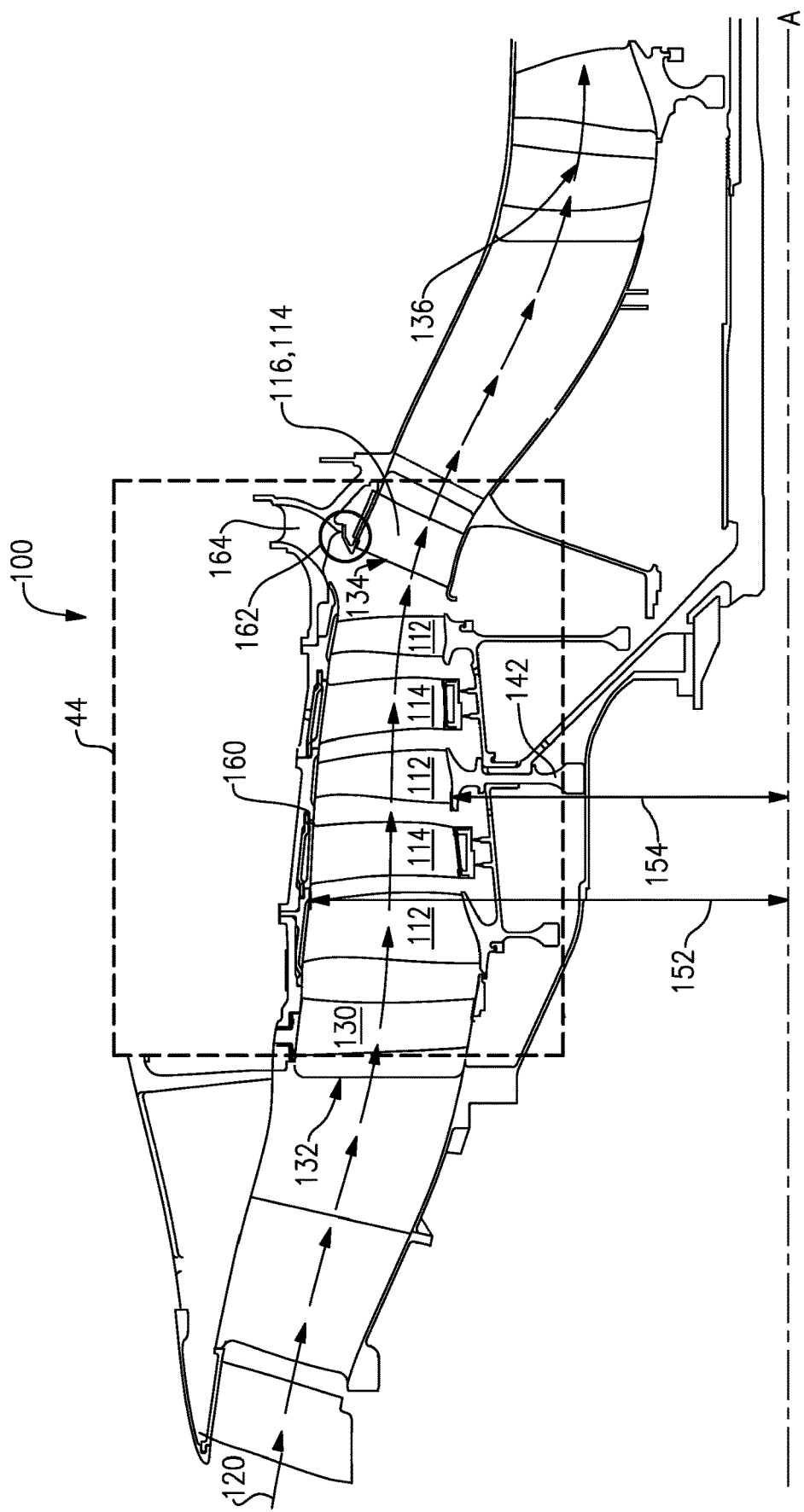
FIG. 2 contextually illustrates an example core flowpath through a low pressure compressor of the gas turbine engine of FIG. 1.

With continued reference to FIG. 1, FIG. 2 is a sectional view of the gas turbine engine 20 of FIG. 1, contextually illustrating a low pressure compressor 44 of the gas turbine engine 20. The core flowpath, identified herein as flowpath 120 or core flowpath 120, passes through the low pressure compressor 44 of the gas-turbine engine 20. The low pressure compressor 44 includes multiple rotor 112/stator 114 pairs that serve to drive air through the core flowpath 120. The rotors 112 are connected to an inner shaft 40 via a compressor frame 142. Interspersed between each of the rotors 112 is a stator 114. The stators 114 are connected to an outer frame 160. The illustrated low pressure compressor 44 is referred to as a three stage compressor as three rotor 112/stator 114 pairs are included. Additional stages can be added or removed depending on design constraints via the addition or removal of rotor 112/stator 114 pairs. A variable guide vane 130 is located at an inlet 132 of the low pressure compressor 44. Alternately, one or more of the stators 114 could also be a variable vane 130. An exit guide vane 116 is located at a fluid outlet 134 of the low pressure compressor 44. In the illustrated example of FIG. 2, the exit guide vane 116 also acts as a stator 114 corresponding to the last rotor 112 of the low pressure compressor 44. The core flowpath 120 has an inner diameter 154 and an outer diameter 152 measured with respect to the engine longitudinal axis A. In embodiments, the outer diameter 152 is defined by one of the rotors 112, and inner diameter 154 is defined by one of the rotors 112, as illustrated in FIG. 2.

As the core flowpath 120 passes through the low pressure compressor 44, the outer diameter 152 slopes inward relative to the engine central longitudinal axis A toward the engine central longitudinal axis A. The inner diameter 154 of the core flowpath 120 slopes outward relative to the engine central longitudinal axis A away from the engine central longitudinal axis A resulting in an increasing inner diameter 154 as the core flowpath 120 progresses along the direction of fluid flow. As a result of the inward sloping outer diameter 152 and the increasing inner diameter 154, the core flowpath 120 has a lower cross sectional area at the fluid outlet 134 than at the fluid inlet 132, and air passing through the low pressure compressor 44 is compressed.

A steeper slope angle of the outer diameter 152, relative to the engine central longitudinal axis A, results in a greater average tip clearance between the rotor blade 112 and the engine case during flight. The additional tip clearance increases flow separation in the air flowing through the core flowpath 120. By way of example, undesirable amounts flow separation can occur when the outer diameter 152 exceeds 15 degrees relative to the engine central longitudinal axis A. Flow separation occurs when the air flow separates from the core flowpath 120 walls. By ensuring that the outer diameter 152 includes a sufficiently low slope angle, relative to the engine central longitudinal axis A, the flow separation resulting from the additional tip clearance is eliminated, and the total amount of flow separation is minimized. In embodiments, a slope angle of the outer diameter 152 is in a range of approximately 0 degrees to approximately 15 degrees relative to the engine central longitudinal axis A. In some example embodiments, a slope angle of the outer diameter 152 is in a range of between approximately 0 degrees and approximately 10 degrees, or more narrowly less than approximately 10 degrees, relative to the engine central longitudinal axis A. In some embodiments, the slope angle is in the range of approximately 5 degrees to 7 degrees, relative to the engine central longitudinal axis A. In another example embodiment, the slope angle of the outer diameter 152 is approximately 6 degrees relative to the engine central longitudinal axis A.

Figure 3:
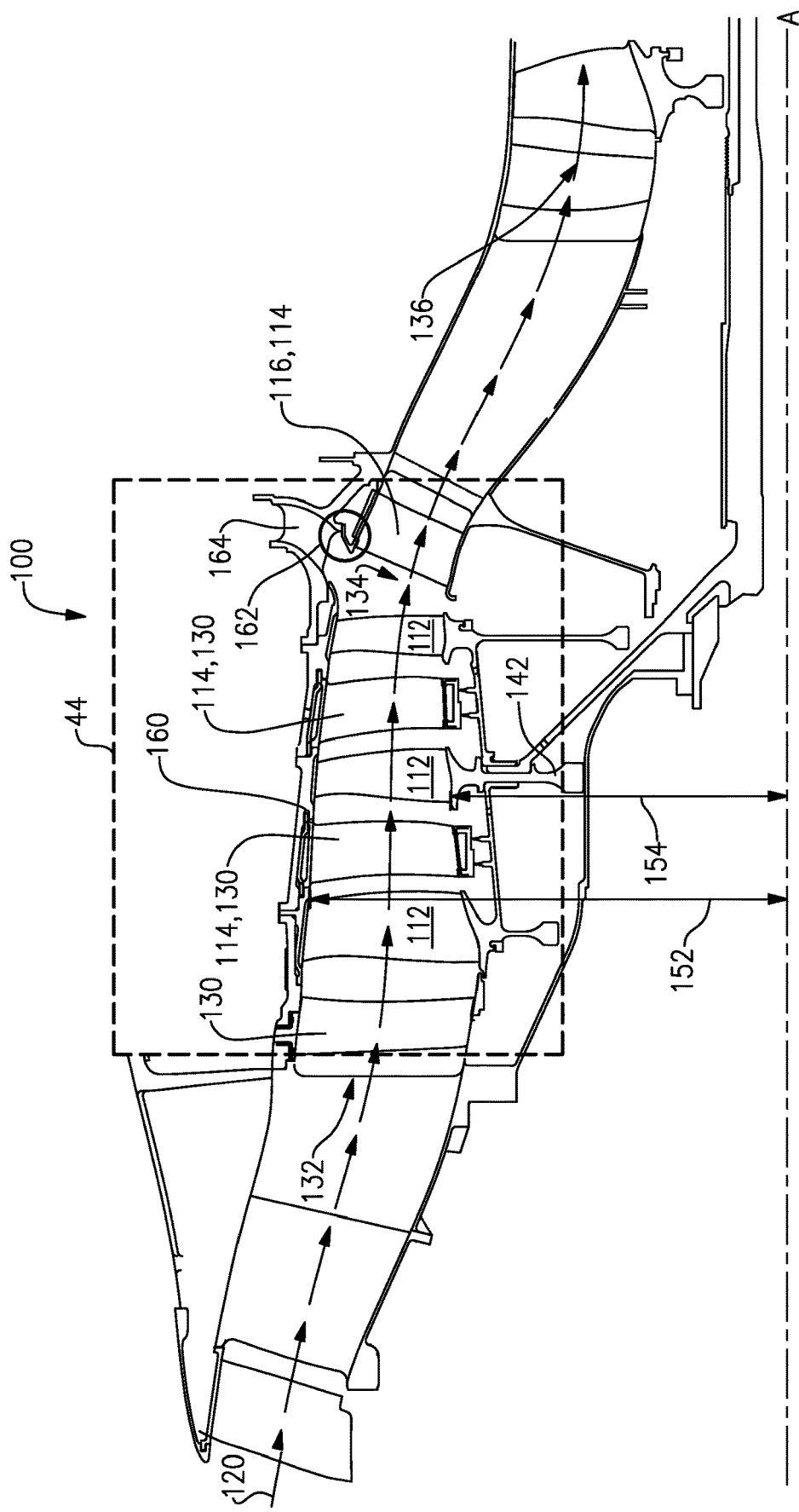
FIG. 3 contextually illustrates another example core flowpath through a low pressure compressor of the gas turbine engine of FIG. 1.

With continued reference to FIGS. 1 and 2, FIG. 3 illustrates an example core flowpath 120. In some example engine embodiments, air flow passing through the core flowpath 120 is not sufficiently stable. In order to increase the stability of the fluid flow, and improve the pressure ratio of the low pressure compressor 44, one or more variable guide vanes 130 are included in the flow path 120. In a three stage geared turbofan compressor 44, such as the one illustrated in FIG. 2, a single variable guide vane 130 can be utilized to sufficiently stabilize the air flow. However, alternate embodiments, such as those utilizing additional compressor stages, may require additional variable guide vanes 130. In such an embodiment, one or more of the stators 114 can be the additional variable guide vanes 130. In alternate examples, the air flow can be sufficiently stable without the inclusion of a variable guide vane 130, and the variable guide vane 130 can be omitted.

In some example embodiments the exit guide vane 116 is incorporated into a low pressure compressor outlet 134 section of the core flowpath 120 the low pressure compressor 44, and to the high pressure compressor 52. The low pressure compressor outlet 134 section of the core flowpath 120 is sloped inward (toward the engine central longitudinal axis A). Placing the exit guide vane 116 in the inward sloping low pressure compressor outlet 134 section of the core flowpath 120 cants the exit guide vane 116 and provides space for a low pressure bleed 164. The low pressure bleed 164 and allows for dirt, rain and ice to be removed from the compressor 44. The low pressure bleed 164 additionally improves the stability of the fluid flowing through the core flowpath 120. The low pressure bleed 164 is positioned between the rotors 112 and the exit guide vane 116. In some example embodiments a bleed trailing edge 162 of the low pressure bleed 164 can extend inward toward the engine central longitudinal axis A, beyond the outer diameter 152 of the core flowpath 120. In such an embodiment the outer diameter of the bleed trailing edge 162 of the low pressure bleed 164 is smaller than the outer diameter 152. Extending the bleed trailing edge 162 inwards allows the bleed 164 to scoop out more of the dirt, rain, ice or other impurities that enter the core flowpath 120.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising: a propulsor section including a propulsor that delivers flow to a core flowpath; a compressor section including a first compressor and a second compressor axially aft of the first compressor relative to an engine longitudinal axis, wherein the first compressor includes a plurality of stages distributed along the engine longitudinal axis, the second compressor includes a greater number of stages than the first compressor, and the core flowpath passes through the first compressor; a geared architecture including an epicyclic gear train; a turbine section including a first turbine and a second turbine, wherein the first turbine includes two stages, the second turbine includes a greater number of stages than the first turbine, the first turbine drives the second compressor, and the second turbine drives the propulsor section through the geared architecture; and wherein the core flowpath in the first compressor has an inner diameter and an outer diameter relative to the engine longitudinal axis, the outer diameter has a slope angle that is at least 5 degrees and no more than 15 degrees relative to the engine longitudinal axis such that the outer diameter of the core flow path slopes toward the engine longitudinal axis along a fluid flow direction of the core flowpath, and the inner diameter of the core flowpath increases through the first compressor along the fluid flow direction of the core flowpath, wherein a forwardmost one of the rotor blades of the first compressor establishing the outer diameter is axially aft of the geared architecture relative to the engine longitudinal axis.

2. The gas turbine engine as recited in claim 1, wherein: the second turbine drives the first compressor and an input of the geared architecture.

3. The gas turbine engine as recited in claim 2, wherein a gear reduction ratio of the epicyclic gear train is greater than 2.25.

4. The gas turbine engine as recited in claim 3, wherein the second turbine includes a greater number of stages than the first compressor, and the slope angle is at least 10 degrees.

5. The gas turbine engine as recited in claim 4, wherein:
the first compressor includes a plurality of rotor blades and a plurality of stators arranged in pairs to establish the plurality of stages of the first compressor; and
the inner and outer diameters are defined by the rotor blades.

6. The gas turbine engine as recited in claim 5, further comprising at least one variable vane situated in the core flowpath at an inlet of the first compressor.

7. The gas turbine engine as recited in claim 3, wherein the epicyclic gear train is a planetary gear system.

8. The gas turbine engine as recited in claim 7, wherein the second turbine includes five stages, and the slope angle is at least 10 degrees.

9. The gas turbine engine as recited in claim 8, wherein the second turbine includes an inlet, an outlet and a pressure ratio greater than 5, and wherein the pressure ratio of the second turbine being pressure measured prior to the inlet as related to pressure at the outlet prior to an exhaust nozzle.

10. The gas turbine engine as recited in claim 9, wherein the turbine section includes a mid-turbine frame between the first turbine and the second turbine, the mid-turbine frame supports a bearing system in the turbine section, and the mid-turbine frame includes airfoils in the core flowpath.

11. The gas turbine engine as recited in claim 9, wherein:
the gas turbine engine is a two-spool engine including a first spool and a second spool;
the first spool includes a first shaft interconnecting the geared architecture, the first compressor and the second turbine; and
the second spool includes a second shaft concentric with the first shaft, and the second shaft interconnects the second compressor and the first turbine.

12. The gas turbine as recited in claim 11, wherein:
the propulsor is a fan surrounded by an outer housing, the fan delivers air into a bypass duct and a portion of air into the compressor section, with a bypass ratio defined as the volume of air delivered into the bypass duct compared to the volume of air delivered into the compressor section, the bypass ratio is greater than 10, the fan has a pressure ratio of less than 1.6 across the fan blade alone at cruise at 0.8 Mach and 35,000 feet, and the fan section has only a single fan stage comprising the fan.

13. A gas turbine engine comprising: a propulsor section including a propulsor that delivers flow to a core flowpath; a compressor section including a first compressor and a second compressor, wherein the first compressor includes a plurality of stages, the second compressor includes a greater number of stages than the first compressor, and the core flowpath passes through the first compressor; a geared architecture including an epicyclic gear train, wherein a gear reduction ratio of the epicyclic gear train is greater than 2.25, and a forwardmost blade row of the first compressor is axially aft of the geared architecture relative to the engine longitudinal axis; a turbine section including a first turbine and a second turbine, wherein the first turbine includes two stages, and wherein the second turbine includes a greater number of stages than the first turbine, the first turbine drives the second compressor, and the second turbine drives the propulsor section through the geared architecture; and wherein the core flowpath within the first compressor has an inner diameter and an outer diameter relative to the engine longitudinal axis, the outer diameter has a slope angle that is at least 5 degrees and less than 10 degrees relative to the engine longitudinal axis such that the outer diameter of the core flow path slopes toward the engine longitudinal axis along a fluid flow direction of the core flowpath, and wherein the inner diameter of the core flowpath increases through the first compressor along the fluid flow direction of the core flowpath.

14. The gas turbine engine as recited in claim 13, wherein the second turbine drives the first compressor and an input of the geared architecture.

15. The gas turbine engine as recited in claim 14, wherein the epicyclic gear train is a planetary gear system.

16. The gas turbine engine as recited in claim 15, wherein the second turbine includes five stages.

17. The gas turbine engine as recited in claim 16, wherein the second turbine includes an inlet, an outlet and a pressure ratio greater than 5, and wherein the pressure ratio of the second turbine being pressure measured prior to the inlet as related to pressure at the outlet prior to an exhaust nozzle.

18. The gas turbine engine as recited in claim 17, wherein the slope angle is at least 5 degrees.

19. The gas turbine engine as recited in claim 18, wherein:
the first compressor includes a plurality of rotor blades and a plurality of stators arranged in pairs to establish the plurality of stages of the first compressor; and
the inner and outer diameters are defined by the rotor blades.

* * * * *